United States Patent [19]

Ehmann et al.

[11] Patent Number: 4,544,689
[45] Date of Patent: Oct. 1, 1985

[54] AQUEOUS POLYVINYL ESTER DISPERSION, PROCESS FOR ITS MANUFACTURE, AND ITS USE

[75] Inventors: Werner Ehmann, Frankfurt am Main; Alfons Homanner, Sulzbach; Helmut Rinno, Hofheim am Taunus, all of Fed. Rep. of Germany

[73] Assignee: Hoechst Aktiengesellschaft, Fed. Rep. of Germany

[21] Appl. No.: 514,171

[22] Filed: Jul. 15, 1983

[30] Foreign Application Priority Data

Jul. 16, 1982 [DE] Fed. Rep. of Germany ....... 3226681

[51] Int. Cl.$^4$ .......................... C08F 18/08; C08F 2/44; C08F 2/20; C09J 3/14
[52] U.S. Cl. ........................................ 524/52; 524/47; 524/734; 156/328; 156/332
[58] Field of Search .................. 524/47, 52, 732, 734; 156/328, 332, 336

[56] References Cited

U.S. PATENT DOCUMENTS

| | | |
|---|---|---|
| 3,442,845 | 5/1969 | Columbus et al. ............... 524/47 |
| 3,620,899 | 11/1971 | Kelly et al. ...................... 156/328 |
| 3,925,289 | 12/1975 | Sakato et al. .................... 524/224 |
| 3,984,275 | 10/1976 | Hofmann et al. ................ 156/332 |
| 4,098,746 | 7/1978 | Becker et al. .................... 524/551 |
| 4,239,563 | 12/1980 | Iacoviello ........................ 156/332 |

*Primary Examiner*—John Kight
*Assistant Examiner*—Nathan M. Nutter
*Attorney, Agent, or Firm*—Berman, Aisenberg & Platt

[57] ABSTRACT

An aqueous polyvinyl ester dispersion having a solids content of 35 to 65 weight % and containing 3 to 12 weight % (relative to the total amount of dispersed particles) of polyvinyl alcohol and 2 to 70 weight % (relative to the total amount of dispersed particles) of a natural starch has excellent adhesive properties. It is manufactured by emulsion polymerization of a vinyl ester optionally together with comonomers, and by subsequent distribution of the starch in the dispersion obtained by the emulsion polymerization. The dispersion is especially suitable for the manufacture of adhesives for porous substrates.

13 Claims, No Drawings

AQUEOUS POLYVINYL ESTER DISPERSION, PROCESS FOR ITS MANUFACTURE, AND ITS USE

The invention relates to a modifed aqueous polyvinyl ester dispersion, a process for the manufacture thereof and its use as adhesive.

Aqueous dispersions of polyvinyl esters, especially of polyvinyl acetate, are applied in most different fields ranging from the use as sizing agents and binders for painting materials to adhesives. These application fields are substantially determined by the differences of the dispersions with respect to their composition or appearance form.

Suitable adhesives for absorptive organic substrates are polyvinyl acetate dispersions, the particle diameter of which is from about 0.3 to 8 $\mu$m and in some cases up to about 20 $\mu$m. The manufacture of these dispersions is state of the art (see German Pat. No. 887,411). Protective colloids, preferably polyvinyl alcohol, are used for their stabilization. The vinyl ester, generally vinyl acetate, is polymerized with the use of free radical-forming substances in an aqueous solution of the protective colloid, optionally containing furthermore small amounts of emulsifiers and buffer substances. This basic process is known to have many variants.

The bonding strength of bonds prepared from polyvinyl ester dispersions is very high, often higher than the cohesion of the substrate. Not only the final bonding strength of a bond is important, but also the speed at which the bonding strength increases must be as high as possible, especially when applying the adhesive by means of machines.

The setting speed of defined dispersions can be increased by external plasticization. However, in the case of polyvinyl alcohol-containing dispersions this effect is insufficient; moreover, the "cold flow" of the gluing is increased and its thermal stability under load is reduced. This is very troublesome for example in the case of wood adhesives. The setting speed can be increased to a certain extent by posterior addition of polyvinyl alcohol to the dispersion. However, this effect is the more reduced the more polyvinyl alcohol is obtained in the dispersion from the start; finally, the setting speed may even be decreased. Moreover, polyvinyl alcohol can be added to a ready-to-use dispersion practically in the form of an aqueous solution only, so that the solids content of the dispersion is reduced to an undesirable extent.

It is the object of the invention to provide a polyvinyl ester dispersion which especially allows the bonding of wood with advantage and ensures a high binding strength after only a few minutes.

It has been found that this object is achieved by adding native starch to a defined polyvinyl ester dispersion.

Subject of the invention is an aqueous polyvinyl ester dispersion having a solids content of from 35 to 65 weight %, wherein from 3 to 60 weight % of the dispersed particles have a diameter of below 1 $\mu$m and consist in an amount of from 95 to 100 weight % of polyvinyl acetate or a vinyl acetate copolymer and in an amount of from 0 to 5 weight % of native starch; from 40 to 97 weight % of the dispersed particles have a diameter of from 1 to 40 $\mu$m and consist in an amount of from 20 to 95 weight % of polyvinyl acetate or a vinyl acetate copolymer and in an amount of from 5 to 80 weight % of native starch; and the dispersion contains from 3 to 12 weight %, relative to the total amount of the dispersion particles, of polyvinyl alcohol.

Subject of the invention is furthermore a process for the manufacture of an aqueous polyvinyl ester dispersion having a solids content of from 35 to 65 weight %, part of the dispersed particles consisting of native starch, by radical-initiated polymerization of vinyl acetate, optionally together with up to about 10 weight %, relative to the total polymer, of copolymerizable compounds, in an aqeous emulsion in the presence of polyvinyl alcohol, which comprises carrying out the polymerization in the presence of from 3 to 15 weight %, relative to the monomer(s) to be polymerized, of polyvinyl alcohol having an ester number of from 60 to 210 and the 4% aqueous solution of which has a viscosity of 4 to 60 mPa.s measured at 20° C., and subsequently distributing the native starch homogeneously in the dispersion obtained.

Subject of the invention is furthermore the use of this polyvinyl ester dispersion for the manufacture of adhesives for porous organic substrates, for example wood.

For the manufacture of the dispersion of the invention an aqueous polyvinyl acetate primary dispersion (which has been prepared with a minimal amount of polyvinyl alcohol having a defined ester number and the particles of which have a defined size) is required. The particles may consist of polyvinyl acetate or a copolymer of a substantial amount of vinyl acetate and small amounts up to about 10 weight %, relative to the total polymer, of other copolymerizable compounds, such as higher vinyl esters, ethylene, maleic esters, acrylic, methacrylic, crotonic, maleic acid or sodium ethenesulfonate.

The polymer primary dispersion required for the manufacture of the dispersion according to the invention is prepared in known manner. Vinyl acetate and, optionally, the comonomers are emulsion-polymerized in an aqueous solution of polyvinyl alcohol, as usual by free-radical-forming initiators, such as peroxydisulfate, hydrogen peroxide, organic peroxides or redox initiators. Preferably, the reaction is carried out by adding the monomer(s) and the initiator within several hours to the polyvinyl alcohol solution preheated to about 40°–80° C. and maintained in motion by an agitator. The polymerization proceeds within this time at a temperature of from about 40° to 100° C., preferably 65° to 90° C., depending on the kind of initiator used and the dissipation of polymerization heat. Alternatively, the complete amount of initiator may be introduced into the aqueous phase before beginning the addition of the monomer(s). Analogously, the complete amount of monomer may be emulsified in the polyvinyl alcohol solution before the start of the polymerization. In a further variant of the dispersion manufacture, polyvinyl alcohol solution, monomers and initiator are mixed and this mixture is continuously fed to the reactor, where the polymerization proceeds. Polyvinyl alcohol serves for stabilizing the polymer dispersion. Mixtures of polyvinyl alcohols of different molecular weight and different hydrolysis degree may be used. From 3 to 15, preferably 4 to 12, weight % of polyvinyl alcohol, relative to the polymerizing monomer, are employed for the manufacture of the dispersion. The viscosity of the 4% aqueous solution of the polyvinyl alcohol is from 4 to 60, preferably 18 to 50, mPa.s, measured at 20° C.; the ester number of the polyvinyl alcohol is from 60 to 210, preferably 100 to 180. In addition to the polyvinyl alcohol, other protective colloids, such as starch derivatives, dissolved native or swelling starch or surface-active ionic or nonionic substances may be contained in the aqueous phase in insignificant amounts. The solids content of the primary dispersion (determined by drying at 110° C.) is from 30 to 65 weight %. It is important only in that it allows the manufacture of dispersions according to the invention having a defined solids content. The latex viscosity of the primary dispersion is generally from 5 to 50 mPa.s.

Such primary dispersions of polyvinyl acetate or copolymers of vinyl acetate are available on the market as commercial products.

A defined amount of native starch is homogeneously distributed in the primary dispersion by means of suitable technical means, such as anchor agitator, high-speed propeller mixer, planetary agitator, roll mill or similar devices.

The dispersion must contain a defined amount of polyvinyl alcohol. Polyvinyl alcohol is therefore added optionally on mixing, too, preferably is an aqueous solution. Alternatively, water alone may be added in order to adjust a defined solids content. The total amount of polyvinyl alcohol contained in the dispersion of the invention, that is, the polyvinyl alcohol in the primary dispersion as well as that optionally added on mixing, should be from 3 to 12, preferably 5 to 10, weight % relative to all dispersed particles. An especially high setting speed of the dispersion is ensured when the polyvinyl alcohol amount relative to all dispersed particles is not substantially lower after addition of the starch than that in the primary dispersion.

It is therefore a preferred embodiment of the process according to the invention that further polyvinyl alcohol is added in an amount corresponding to that of the starch on mixing of the dispersion with the starch.

The primary dispersion and the native starch may be mixed in such a manner that the starch is suspended in the amount of water or polyvinyl alcohol solution (a polyvinyl alcohol the 4% aqueous solution of which has a viscosity of more than 16, preferably 20 to 60, mPa.s is preferred), and this preliminary suspension is mixed with the primary dispersion. Alternatively, the dry starch may be introduced with stirring or kneading into the primary dispersion, optionally after mixing with water or polyvinyl alcohol solution. Care has to be taken however that the temperature of the mixture does not exceed the gelatinization temperature of the starch particles. The dispersion so obtained contains a non-volatile amount of 35 to 65 weight %.

The starch is native, that is, chemically unmodified starch which has not been subjected to a degradation process. The starch grains have a diameter of about 1 to 40, preferably 2 to 25, μm, as in the case of, for example starches obtained from corn, rice or wheat.

From 95 to 100 weight % of the small particles (smaller than 1 μm) in the ready-to-use dispersion of the invention consist of polyvinyl acetate or a vinyl acetate copolymer, the starch proportion being from 0 to 5 weight %. From 20 to 95, preferably 40 to 95, weight % of the large particles (1 to 40 μm) consist of polyvinyl acetate or a vinyl acetate copolymer; from 6 to 80, preferably 5 to 60, weight % consist of starch. From 2 to 70, preferably 5 to 50, weight % of the total amount of dispersed particles consist of starch.

The adhesion properties are tested as follows: The dispersion to be tested is applied onto a test specimen of beach-wood in a layer thickness of 0.3 mm. Another test specimen is pressed thereon for 2.5 minutes under a pressure of 1 bar over an area of 3 $cm^2$. The bonding strength is determined immediately thereafter by means of a tensile testing machine, and the arithmetical mean from 20 bonds is calculated in $N/mm^2$, which is a measure for the setting speed. After a storage time of 24 hours and subsequent tensile testing, the value of the final bonding strength is determined.

It was to be expected that, when replacing (in a polyvinyl acetate dispersion) the plastic polyvinyl acetate particles in part by rigid starch particles which are neutral with respect to adhesion, the adhesiveness of the dispersion would be more or less reduced. In fact, however, it is maintained up to a considerable proportion of starch. It is surprising to observe that the setting speed, for example on gluing of wood with the use of the dispersion according to the invention, is first pronouncedly increased at increasing amounts of starch particles, and is not reduced but at a higher elevated starch content.

The dispersion of the invention is especially suitable for bonding porous substrates, for example in the case where rapid setting is intended. A further advantage resides in the fact that this effect is ensured by using starch, that is, a material independent of crude oil.

The following examples illustrate the invention; percentages being by weight.

EXAMPLES 1 TO 7 AND COMPARATIVE EXAMPLE A

By means of a high-speed propeller mixer there are mixed:
1. an aqueous polyvinyl acetate dispersion A 1 containing about 60% of non-volatile substances. It contains about 56% of polyvinyl acetate particles 53% of which have a diameter of below 1 μm and 47% of which have a diameter of 1 to 5 μm, and it was prepared as follows: To a 100 liter vessel of stainless steel provided with anchor agitator (100 rpm), reflux condenser, heating, cooling and dosing devices 22 kg of deionized water were fed, and 2.2 kg of a polyvinyl alcohol having an ester number of 135 and a viscosity of its 4% aqueous solution at 20° C. of 20 mPa.s were dissolved therein. 0.6 g of cobalt acetate was added, and the batch was adjusted to pH 4 by means of 2N sulfuric acid. 32 kg of vinyl acetate and 75 g of 30% hydrogen peroxide were added with agitation. By heating the contents of the vessel to the reflux temperature of the vinyl acetate, polymerization was started, and proceeded within about 2 hours. For completion of the reaction, the batch was maintained for another hour at 80° C., and the dispersion was then cooled.
2. an 8.9% aqueous solution B1 of polyvinyl alcohol having an ester number of 90, than 4% aqueous solution of which has a viscosity of 23 mPa.s;
3. a natural corn starch containing 10% of water. 90% at least of the starch particles have a diameter of 5 to 22 μm.

Table 1 indicates the varying mixing ratios and the bonding strength values obtained on gluing of beech-wood using these mixtures, after 2.5 minutes and after 24 hours. For comparison, a test using the primary dispersion A1 alone was carried out (=comparative Example A).

TABLE 1

| Example | Disp. A1 | PVAL-soln. B1 | Corn starch | Bonding strength in N/mm² after 2½ min | 24 h |
|---|---|---|---|---|---|
| Comparison A | 1000 g | — | — | 3.6 | 7.3 |
| 1 | " | 30 g | 51 g | 4.0 | 7.2 |
| 2 | " | 90 g | 153 g | 4.2 | 7.2 |
| 3 | " | 150 g | 255 g | 4.5 | 7.3 |
| 4 | " | 240 g | 408 g | 4.8 | 7.2 |
| 5 | " | 330 g | 561 g | 4.3 | 7.1 |
| 6 | " | 450 g | 765 g | 4.1 | 7.0 |
| 7 | " | 600 g | 1020 g | 3.7 | 6.9 |

EXAMPLES 8 TO 11

There are mixed:
1. the polyvinyl acetate dispersion A1 as in Examples 1 to 7;
2. a 5% aqueous solution B2 of a polyvinyl alcohol having an ester number of 130, the 4% aqueous solution of which has a viscosity of 26 mPa.s;
3. a rice starch containing 95 weight % of non-volatile substances and having a particle size of 2 to 6 μm.

Table 2 indicates the mixing ratios and the bonding strength values obtained on gluing of beech-wood using these mixtures, after 2.5 minutes and 24 hours.

TABLE 2

| Example | Disp. A1 | PVAL-soln. B2 | Rice starch | Bonding strength in N/mm² after 2½ min | 24 h |
|---|---|---|---|---|---|
| Comparison A | 1000 g | — | — | 3.6 | 7.3 |
| 8 | " | 70 g | 110 g | 3.8 | 7.4 |
| 9 | " | 210 g | 330 g | 4.1 | 7.1 |
| 10 | " | 420 g | 660 g | 3.9 | 7.0 |
| 11 | " | 560 g | 880 g | 3.4 | 6.7 |

EXAMPLES 12 AND 13 AND COMPARATIVE EXAMPLE B

There are mixed:
1. an aqueous dispersion A2 containing about 50% of non-volatile substances. It contains 45.4% of polyvinyl acetate particles 20% of which have a diameter of below 1 μm and 80% of which have a diameter of 1 to 5 μm, and it was prepared as follows: To 100 liter vessel of stainless steel provided with anchor agitator (100 rpm), reflux condenser, heating, cooling and dosing devices 27 kg of deionized water were fed, and 2.5 kg of a polyvinyl alcohol having an ester number of 140 and a viscosity of its 4% aqueous solution at 20° C. of 26 mPa.s were dissolved therein. 25 kg of vinyl acetate, 0.04 kg of maleic anhydride, 0.01 kg of dilauroyl peroxide and 0.005 kg of sodium peroxydisulfate were added with agitation. Polymerization was carried out with reflux of the vinyl acetate.
2. a wheat starch containing 87% on non-volatile substances and having a particle size of 3 to 28 μm.

Table 3 indicates the mixing ratios and the bonding strength values obtained on gluing of beech-wood using these mixtures, after 2.5 minutes and after 24 hours.

For comparison, a test using the primary dispersion A2 alone was carried out (=Comparative Example B)

TABLE 3

| Example | Disp. A2 | Wheat starch | Bonding strength in N/mm² after 2½ min | 24 h |
|---|---|---|---|---|
| Comparison B | 1000 g | — | 3.5 | 8.0 |
| 12 | " | 200 g | 4.3 | 7.9 |
| 13 | " | 300 g | 3.6 | 7.4 |

EXAMPLES 14 TO 20 AND COMPARATIVE EXAMPLE C

There were mixed:
1. an aqueous primary dispersion A3 containing about 40% of non-volatile substances. It contains about 37% of particles of a copolymer of vinyl acetate and sodium ethenesulfonate, 33% of which have a diameter below 1 μm and 67% of which have a diameter of 1 to 12 μm. It was prepared as follows: In 100 liter vessel of stainless steel provided with anchor agitator (100 rpm), reflux condenser, heating, cooling and dosing devices 1.2 kg of a polyvinyl alcohol having an ester number of 120 and a viscosity of its 4% aqueous solution at 20° C. of 20 mPa.s and 1.2 kg of a polyvinyl alcohol having an ester number of 160 and a viscosity of its 4% aqueous solution at 20° C. of 40 mPa.s were dissolved in 47 kg of deionized water. 1 kg of an aqueous 25% solution of sodium ethenesulfonate was added. The contents of the vessel were heated to 66° C., 3 kg of vinyl acetate were emulsified therein, and 25 g of ammonium peroxydisulfate were then added. After 40 minutes, dosage of 27 kg of vinyl acetate was started and continued and completed within 4 hours. By corresponding handling of the heating and cooling means the polymerization was carried out at a temperature of 70°-72° C. After the addition of the vinyl acetate, 5 g of ammonium peroxydisulfate dissolved in 100 g of water were added, and the reaction mixture was then maintained at 80° C. for a further 2 hours in order to complete the polymerization.
2. a 12% aqueous solution B3 of a polyvinyl alcohol having an ester number of 60, the 4% aqueous solution of which has a viscosity of 18 mPa.s;
3. a corn starch containing 87% of non-volatile substances and having a particle diameter of 7 to 20 μm.

Table 4 indicates the mixing ratios and the adhesive properties.

For comparison, a test using the primary dispersion A3 alone was carried out (=Comparative Example C).

TABLE 4

| Example | Disp. A3 | PVAL-soln. B3 | Corn starch | Bonding strength in N/mm² after 2½ min | 24 h |
|---|---|---|---|---|---|
| Comparison C | 1000 g | — | — | 1.7 | 9.5 |
| 14 | " | 35 g | 50 g | 1.9 | 9.4 |
| 15 | " | 70 g | 100 g | 2.4 | 9.5 |
| 16 | " | 140 g | 200 g | 3.5 | 9.3 |
| 17 | " | 210 g | 300 g | 3.6 | 9.4 |
| 18 | " | 280 g | 400 g | 3.4 | 9.3 |
| 19 | " | 420 g | 600 g | 2.8 | 9.1 |
| 20 | " | 560 g | 800 g | 2.0 | 8.9 |

What is claimed is:
1. An aqueous polyvinyl ester dispersion having a solid content of from 35 to 65 weight %, from 3 to 60 weight % of dispersed particles of which has a diameter of below 1 μm and consists of from 95 to 100 weight % of polyvinyl acetate or a vinyl acetate copolymer and from 0 to 5 weight % of native starch, from 40 to 97 weight % of dispersed particles of which has a diameter of from 1 to 40 μm and consists of from 20 to 95 weight % of polyvinyl acetate or a vinyl acetate copolymer and from 5 to 80 weight % of native starch, and the dispersion contains from 3 to 12 weight %, relative to the total amount of dispersed particles, of polyvinyl alcohol.

2. A process for the manufacture of an aqueous polyvinyl ester dispersion, having a solids content of from 35 to 65 weight % and dispersed particles of native starch, by free-radical-initiated polymerization of vinyl acetate, optionally together with up to about 10 weight %, relative to total polymer, of copolymerizable compounds, in an aqueous emulsion in the presence of polyvinyl alcohol, which comprises carrying out the polymerization in the presence of from 3 to 15 weight %, relative to the vinyl ester to be polymerized, of polyvinyl alcohol, having an ester number of from 60 to 210 and a viscosity (as a 4% aqueous solution) of from 4 to 60 mPa.s (measured at 20° C.), and subsequently distributing the native starch homogeneously in the obtained dispersion.

3. Use of the dispersion as claimed in claim 1 for manufacturing adhesives for porous substrates.

4. In a process for securing porous substrates together with an adhesive, the improvement wherein the adhesive comprises a dispersion as claimed in claim 1.

5. A process for increasing the setting speed of adhesive comprising a polyvinyl acetate dispersion which comprises incorporating into the dispersion an amount of native starch particles sufficient to reduce the setting time without significantly reducing bonding strength.

6. An aqueous polyvinyl ester dispersion as claimed in claim 1 wherein from 95 to 100 weight % of the dispersed particles having a diameter below 1 μm and from 20 to 95 weight % of those having a diameter of from 1 to 40 μm are polyvinyl acetate.

7. An aqueous polyvinyl ester dispersion as claimed in claim 1 wherein from 95 to 100 weight % of the dispersed particles having a diameter below 1 μm and from 20 to 95 weight % of those having a diameter of from 1 to 40 μm are vinyl acetate copolymer.

8. An aqueous dispersion as claimed in claim 1 in which the sole essential components are:
 (a) one polymer selected from the group consisting of polyvinyl acetate and a vinyl acetate copolymer,
 (b) native starch,
 (c) polyvinyl alcohol and
 (d) water.

9. An aqueous dispersion as claimed in claim 8 wherein the polymer is a copolymer of vinyl acetate and sodium ethenesulfonate.

10. An aqueous dispersion as claimed in claim 8 wherein the polymer is a copolymer of vinyl acetate and up to about 10 weight % relative to the total polymer, of a higher vinyl ester, ethylene, a maleic ester, acrylic acid, methacrylic acid, crotonic acid, maleic acid or sodium ethenesulfonate.

11. An aqueous dispersion as claimed in claim 1 in which the sole essential components are:
 (a) one polymer selected from the group consisting of polyvinyl acetate and a vinyl acetate copolymer,
 (b) water-insoluble native starch,
 (c) polyvinyl alcohol, and
 (d) water.

12. A process according to claim 5 wherein the native starch is water-insoluble native starch.

13. An aqueous dispersion as claimed in claim 1, the dispersed particles of which consist of:
 (a) polyvinyl acetate or a vinyl acetate copolymer and
 (b) water-insoluble native starch.

* * * * *